United States Patent Office 3,427,250
Patented Feb. 11, 1969

3,427,250
MICROSCOPIC CAPSULES AND PROCESS FOR THEIR PREPARATION
Howard C. Haas, Arlington, and Lloyd D. Taylor, Everett, Mass., assignors to Polaroid Corporation, Cambridge, Mass., a corporation of Delaware
No Drawing. Filed Mar. 25, 1963, Ser. No. 267,768
U.S. Cl. 252—316
Int. Cl. B01j 13/02
4 Claims This invention relates to a process for making minute, substantially spherical, individual, pressure-rupturable capsules and more particularly to such a process wherein the capsule walls are composed of a solid polymeric material formed of a polymerized monomeric material.

One object of this invention is to provide a novel process for forming a capsule wall by means of anionic polymerization at the interface of the encapsulated material.

Another object of this invention is to provide a novel process for encapsulating an aqueous medium in a polymeric capsule.

Still another object of this invention is to provide a novel process for the preparation of microscopic capsules wherein the formation of the polymeric capsule wall is achieved by freezing a solution of polymerization initiator and polymerizing a monomer at the surface of said frozen solution.

Still another object of this invention is to provide microscopic polymeric capsules containing an anionic polymerization initiator.

Other objects of the invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description.

The formation of pressure-rupturable capsules consisting of a nucleus comprising, for example, a liquid around which is deposited a dense, shell-like coating of a film-forming, organic, polymeric material, is well known to the art. One illustrative method of making microscopic, pressure-rupturable capsules comprises preparing an aqueous solution of a polymeric material, emulsifying therein a water-immiscible organic liquid, agitating the system until the required microscopic drop size of the organic liquid is attained and thereafter acidifying the aqueous solution causing the polymeric material to come out of solution and deposit around each microscopic drop of organic liquid. The foregoing steps are carried out at a temperature above the gelation or solidification point of the polymeric material. Gelation or solidification of the encapsulating is then achieved by cooling to a temperature below the gelatin or solidification point of the material. Preferably, the cooling step is performed rapidly in order to provide a small pore size in the resulting capsules.

In the novel process of this invention, the capsule wall is formed by the polymerization of a monomer around a nucleus rather than the deposition of a polymer from a solution of polymer. The formation of the polymer is catalyzed by the nucleus itself, the internal phase, and polymer will deposit around the droplet, encapsulating said droplet.

In carrying out the novel process of this invention, an anionic polymerization initiator is dispersed in an organic solvent in which it is immiscible and vigorous agitation is applied to the dispersion in order to form minute droplets of said polymerization initiator. A monomer, which is soluble in the organic solvent and which is polymerizable upon the action of the initiator, is added to the dispersion. At the surface of the droplets, polymerization of the monomer will take place thereby forming a polymeric shell enclosing said droplet. Agitation is then stopped and the thus-formed capsules are removed.

Monomers suitable for use in the present invention are monomers which have an ethylenically unsaturated group wherein the positive charge on the double bond is such that an anion will attack it. Monomers suitable for use within the scope of this invention may be represented by the formula:

(A)       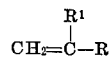

wherein R is an electron-withdrawing group and $R^1$ is hydrogen or an electron-withdrawing group.

As examples of monomers within Formula A, mention may be made of acrylonitrile, methylmethacrylate, diethylmethylenemalonate, vinylidene chloride, methylvinyl ketone, nitroethylene and 2-nitropropene and xylylene-type monomers, particularly benzyl trialkyl ammonium salts of said xylylene monomers, e.g., p-dodecylbenzyltrimethylammonium chloride and p-methylbenzyltrimethylammonium chloride.

As examples of suitable anionic polymerization initiators, mention may be made of solutions of alkali metal hydroxides, such as sodium hydroxide aliphatic secondary and tertiary amines such as diethylamine and tributylamine.

Preferably, the alkali metal hydroxides are in aqueous solutions, however, it should be understood that the solvent may comprise an organic material provided it is immiscible in the monomer solvent, nonreactive with the monomer and provided the alkali metal hydroxide will initiate polymerization in such a solution.

Since the presence of water often acts to inhibit anionic polymerization, it may be desirable to minimize the effect of the water on the reaction. In a preferred embodiment, the effect of water on the reaction is minimized by lowering the water vapor pressure of the water by freezing the aqueous solution of the initiator. In the preferred embodiment, the aqueous solution of the polymerization initiator is dispersed in the organic solvent and the temperature is lowered below the freezing point of the initiator while the dispersion is vigorously agitated, thereby forming microscopic frozen droplets of polymerization initiator. Upon the addition of the monomer to the dispersion, polymerization of said monomer would occur at the interface of the frozen droplets thereby forming a polymeric shell around the frozen droplet. The thus-formed capsules could then be removed and allowed to come to room temperature where the nucleus would once again be liquid in form.

The following nonlimiting example illustrates the novel preparation of microscopic capsules within the scope of the present invention.

EXAMPLE

A mixture of 500 ml. of hexane and 100 gm. of 50% aqueous sodium hydroxide solution was added to a 3-necked round-bottom flask fitted with a stirrer. The mixture was deaerated with nitrogen for 3 minutes and the temperature was then dropped to −50° C. to form frozen sodium hydroxide droplets. Acrylonitrile (26.5 gm.) was added and the mixture was stirred for 50 hours at a temperature below −30° C. Microscopic capsules averaging about 50 microns in diameter comprising walls of polyacrylonitrile enclosing 50% sodium hydroxide were formed.

The size of the microscopic capsules prepared by the novel process of this invention is determined by the degree of agitation imparted to the dispersion of polymerization initiator in the organic solvent. The more vigorous the agitation the smaller the droplets which will be encapsulated by the subsequent polymerization. Capsules ranging in diameter from 1 to 100 microns may be prepared by the novel process of the present invention.

The novel process of this invention is also useful in encapsulating in polymeric shells materials which are not reactive with the particular polymerization initiator but which are soluble or dispersable in said initiator. For example, an antifoggant such as 2-methylbenzimidazole may be incorporated into a sodium hydroxide solution and capsule formation is then carried out with the sodium hydroxide as the polymerization initiator.

The microscopic pressure-rupturable capsules prepared by the novel process of the present invention may be used in processing photographic elements. For example, the capsules prepared by the novel process of the present invention which contain aqueous sodium hydroxide may be used as the liquid-containing means of the photographic product disclosed and claimed in U.S. Patent No. 2,543,181 issued Feb. 27, 1951 to Edwin H. Land.

Since certain changes may be made in the above process without departing from the scope of the invention herein involved, it is intended that all matter contained in the above description shall be interpreted as illustrative and not in a limiting sense.

What is claimed is:

1. A process for the preparation of microscopic capsules which comprises, in combination, the steps of dispersing an aqueous solution of an anionic polymerization initiator selected from the group consisting of alkali metal hydroxides, aliphatic secondary amines, and aliphatic tertiary amines in a water-immiscible organic liquid solvent for a monomer capable of being anionically polymerized upon contact with said initiator, said monomer being represented by the structural formula:

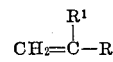

wherein:

R is an electron withdrawing group selected from the group consisting of

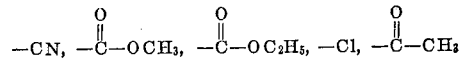

and $-NO_2$; and $R^1$ is selected from the group consisting of hydrogen and R; thereby providing a dispersion of aqueous droplets containing said initiator in said solvent, and dissolving in said solvent said monomer thereby polymerizing said monomer at the interface between said droplets and said solvent to provide a separate, substantially continuous wall of polymer around individual droplets.

2. Microscopic capsules prepared according to the process of claim 1.

3. A process as defined in claim 1 wherein said polymerization is conducted at a temperature below the freezing point of said aqueous droplets.

4. Microscopic capsules prepared according to the process of claim 3.

References Cited

UNITED STATES PATENTS

| | | | |
|---|---|---|---|
| 2,776,946 | 1/1957 | Lytton et al. | 117—161 X |
| 2,969,330 | 1/1961 | Brynko | 252—316 |
| 2,969,331 | 1/1961 | Brynko et al. | 252—316 |

FOREIGN PATENTS

| | | |
|---|---|---|
| 221,880 | 5/1959 | Australia. |

RICHARD D. LOVERLING, *Primary Examiner.*

U.S. Cl. X.R.

96—29, 76; 117—100; 260—29.6